United States Patent [19]

Tarzian

[11] 4,224,729
[45] Sep. 30, 1980

[54] CONTINUOUS ROTARY AND WORK PROCESS APPARATUS

[75] Inventor: George M. Tarzian, Chicago, Ill.

[73] Assignee: Chicago Automatic Machine, Inc., Skokie, Ill.

[21] Appl. No.: 911,795

[22] Filed: Jun. 2, 1978

[51] Int. Cl.³ .................... B23P 19/08; B23P 23/00
[52] U.S. Cl. ................... 29/240; 10/155 A; 29/38 A; 29/786; 408/32
[58] Field of Search ............... 10/DIG. 3, 2, 130, 132, 10/155 R, 155 A, 169; 29/36, 37, 38 A, 240, 429, 786, 563; 408/35, 38, 39, 40, 41, 32, 33

[56] References Cited

U.S. PATENT DOCUMENTS

| | | | |
|---|---|---|---|
| 1,762,192 | 6/1930 | Pierce | 10/155 R |
| 2,802,224 | 8/1957 | Hillman | 10/DIG. 3 |
| 2,825,121 | 3/1958 | Williams | 29/37 |
| 3,024,523 | 3/1962 | Donaldson | 10/155 A |
| 3,212,114 | 10/1965 | Pipes | 10/155 A |
| 3,225,370 | 12/1965 | Pipes | 10/155 A |
| 3,230,602 | 1/1966 | Bozek | 29/563 |
| 4,058,866 | 11/1977 | Foster | 10/155 A |
| 4,138,754 | 2/1979 | Baer | 10/2 |

FOREIGN PATENT DOCUMENTS 3382  3/1916  United Kingdom ............ 10/132

*Primary Examiner*—Ervin M. Combs
*Attorney, Agent, or Firm*—Irving Faber

[57] ABSTRACT

This invention relates to a new and useful continuous rotary and work process apparatus. The apparatus comprises one or more annular turrets arranged on a common axis coacting mechanically in unison and performing a variety of assembly, packaging, or other processes or mechanical functions. The apparatus incorporates an internal cam system incorporating means for performing a multiplicity of mechanical actions within the outer perimeter fo the annular turret or annulus.

35 Claims, 14 Drawing Figures

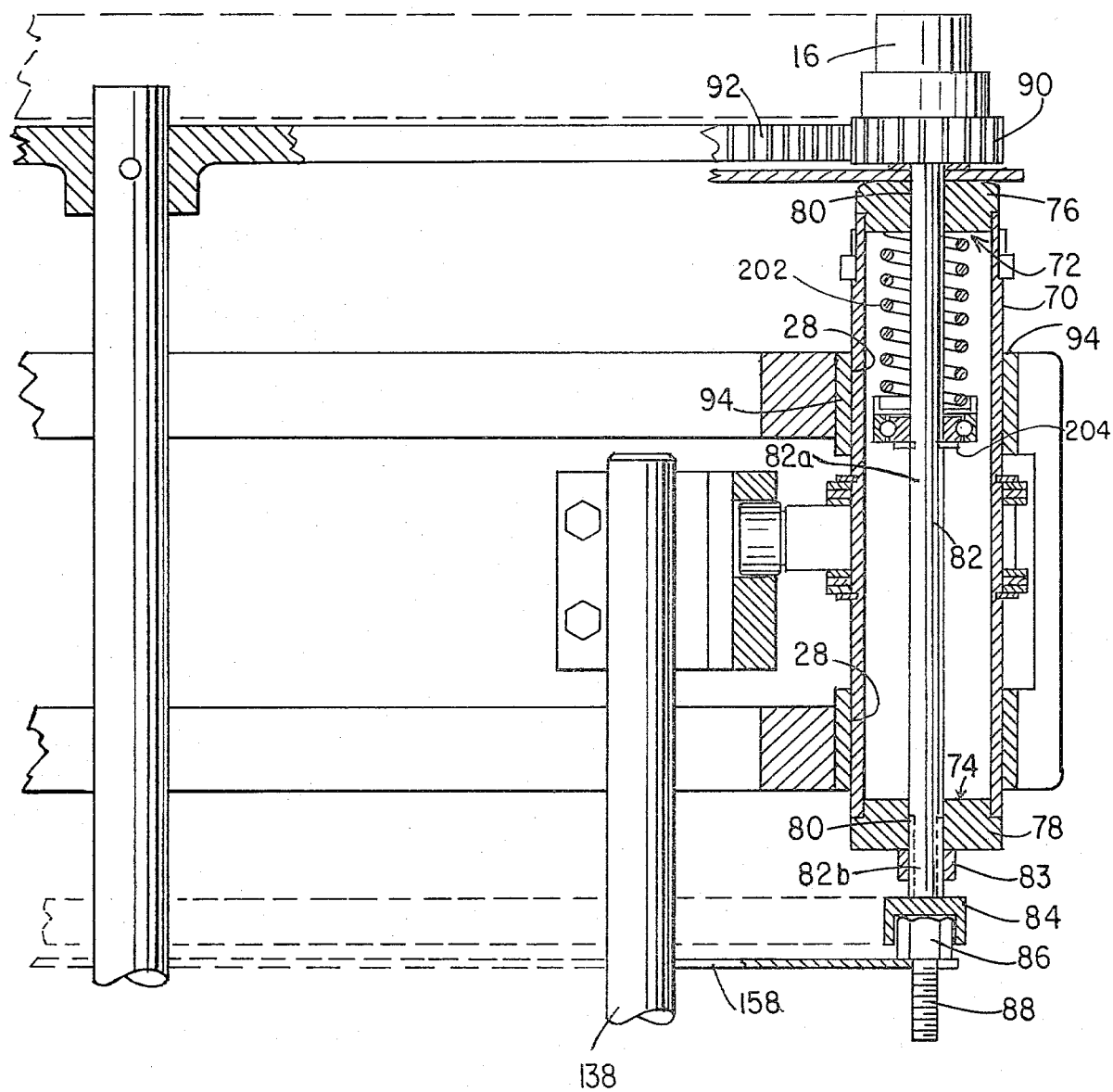

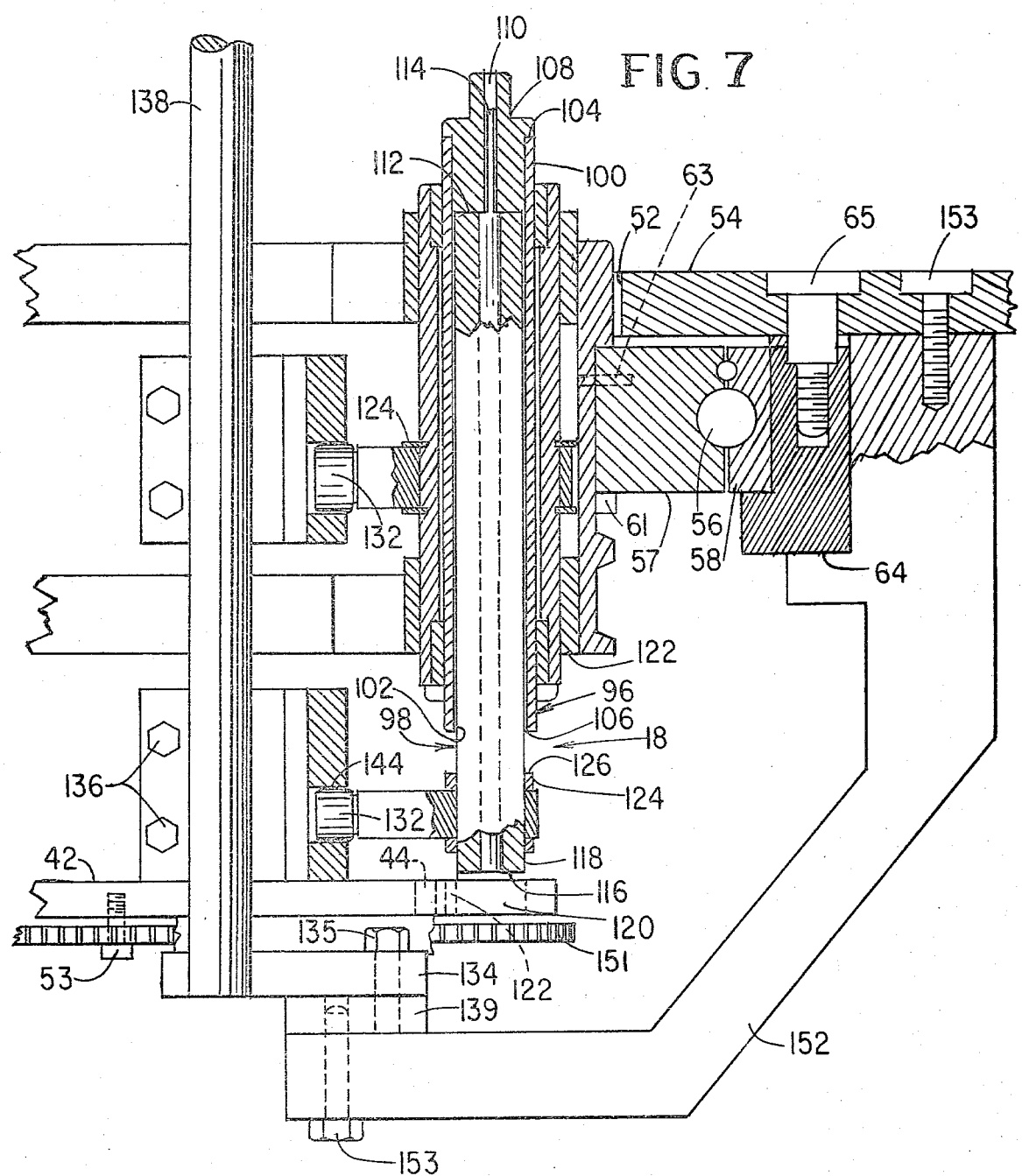

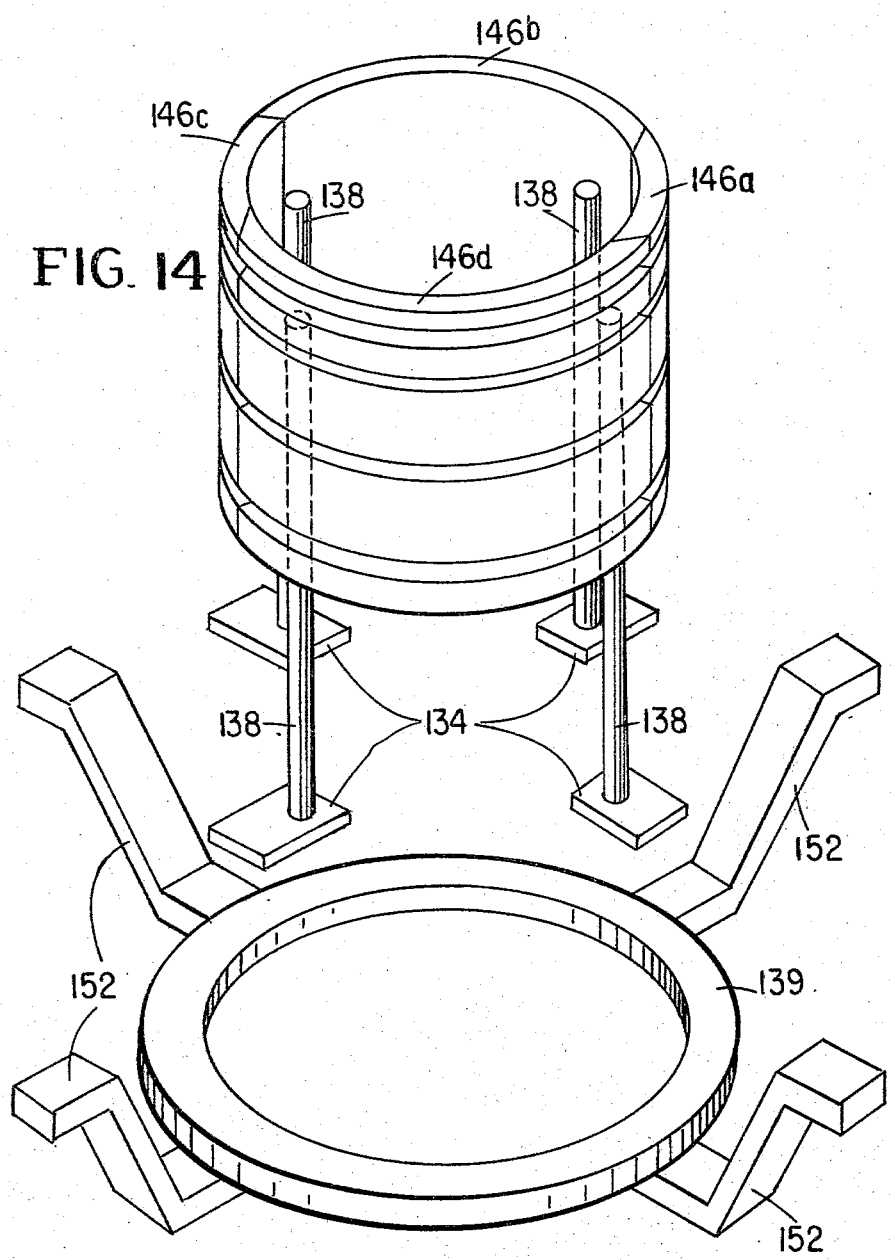

CONTINUOUS ROTARY AND WORK PROCESS APPARATUS

BACKGROUND OF INVENTION

Turret and cam operated apparatuses are well known in the art, primarily in the food processing industry. The existing turret and cam operated apparatuseses are special purpose machines; for example, a bottling machine that delivers a specific quantity of fluid into a bottle. The design of the existing turret and cam operated apparatuses inhibits the changing of cams, thus inhibiting the change of use of the apparatus. That is why the existing apparatuses are special purpose machines. Further, continuous rotary machines are difficult to tool and maintain because of their common center shaft suspension. It is the cams that enable a mechanical function or process to occur. Therefore, if the cams could be readily changed, that which was a special purpose apparatus would now be a multi-purpose apparatus. Further, the ability to change cams would enable one machine to process various sizes or quantities of the same product.

There is a need, if not a demand, for a Continuous Rotary Assembly Apparatus that enables the cams to be easily and readily changed; said cams directly or indirectly being responsible for a mechanical action or inaction. If the cams could be changed, one machine could be used to produce a product of different sizes or fill a container with different quantities of product. The ability to use an apparatus for multiple purposes significantly reduces the investment a company would have to make in purchasing a machine for every purpose. The reduction in investment for special purpose machines directly relates to a company's profit structure. In other words, an apparatus that can be used as a bottling machine and canning machine simply by changing cams reduces the investment of a company by one machine. This saves money; hence resulting in larger profits.

I am not aware of any Continuous Rotary and Work Process Apparatuses that permit the changing of cams enabling the apparatus to perform a different process or mechanical function. The existing apparatuses are primarily for special purposes having internal cam operating systems that cannot be changed to enable said apparatus to perform a different function.

My Continuous Rotary and Work Process Apparatus incorporates a totally new design having an internal cam structure positioned within the annulus of an annular turret; said cam structure enabling a multiplicity of mechanical actions or functions to occur. My multi-purpose apparatus will substantially reduce the number of special purpose machines a company would have to purchase; thus substantially increasing the company's profit position.

SUMMARY OF INVENTION

This invention relates to a new and useful continuous rotary work and process apparatus that can be used for a plurality of purposes. My invention incorporates a cam structure positioned within the annulus of one or more annular turrets. The cam structure is positioned to allow the cams to be easily changed, added to or removed from the cam structure, thereby enabling the purpose or function of the apparatus to be changed. If more than one annular turret is used, the plurality of annular turrets are arranged in tandem having a common axis. The plurality of annular turrets coact in mechanical unison performing a plurality of processes and/or mechanical acts. Each turret comprises a series of process spindles radially arranged parallel to the turret axis. The spindles are provided with one or a plurality of cam actuation means. The cam actuation means are coupled to the spindle complex, internal or external thereto. The spindles are designed for either reciprocatory or rotary action depending on the motion requirement and whether it performs as a carrier for a part, or work processing member. Cam actuation is imparted to the spindle by means of a cam follower coupled to a barrel cam. The barrel cam or cams are segmented to facilitate the changing of cams and cam functions.

Accordingly, it is an object of this invention to provide a continuous rotary and work process apparatus that can be used for multiple purposes.

Another object of the invention is to provide a continuous rotary and work process apparatus that has a plurality of cam actuated spindles performing separate and distinct functions.

A further object of the invention is to provide a continuous rotary and work process apparatus having means to readily change the cams coupled to the spindles changing the process or mechanical function thereof.

A further object of the invention is to provide a continuous rotary and work process apparatus that can perform the same functions as two or more special purpose machines by altering the cam structure of the apparatus.

In the Drawings:

FIG. 6 is a cut-a-way view of the upper spindle of the apparatus embodied by the invention.

FIG. 7 is a cut-a-way view of the lower spindles and support structure of the apparatus embodied by the invention.

FIG. 14 is an exploded view of the support ring, support brackets and rods of the apparatus embodied by the invention.

DESCRIPTION OF PREFERRED EMBODIMENT

The preferred embodiment illustrated in drawings 1 through 14 as described herein is not intended to be exhaustive or to limit the invention to the precise form disclosed. It is chosen and described in order to best explain the principles of the invention and its application and practical use to thereby enable others skilled in the art to best utilize the invention.

Figure 1:
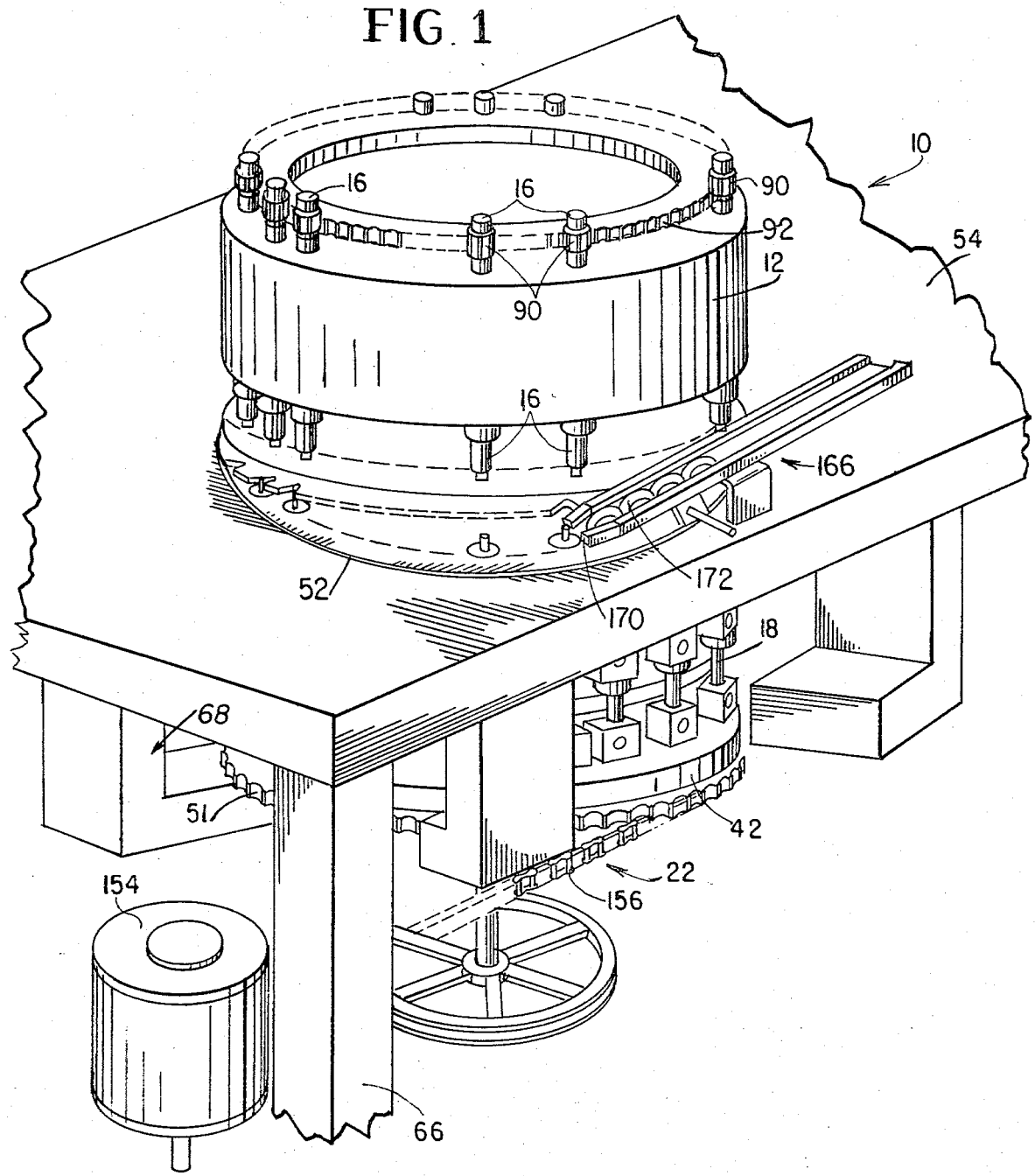
FIG. 1 is a perspective view of the apparatus embodied by the invention.
Figure 2:
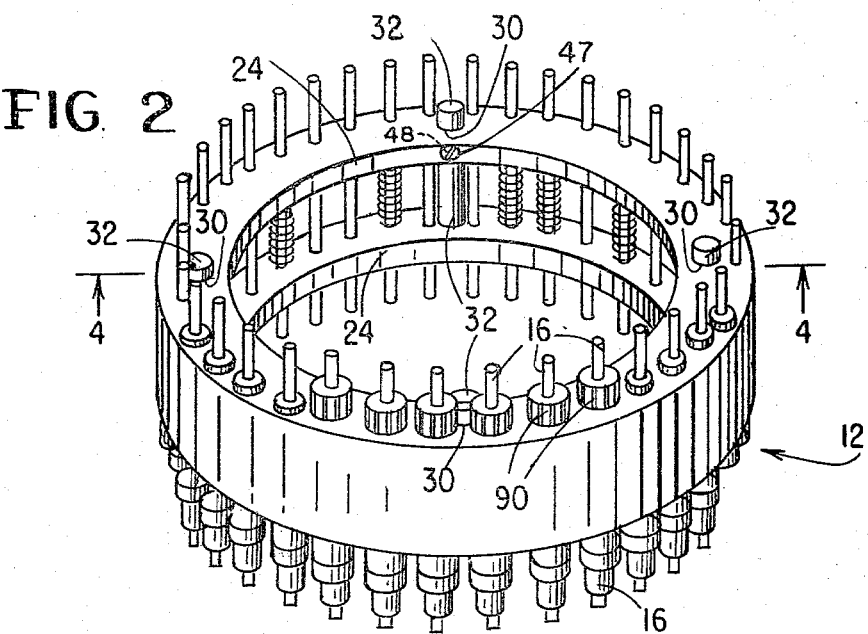
FIG. 2 is a perspective view of the upper turret embodied by the invention.
Figure 4:
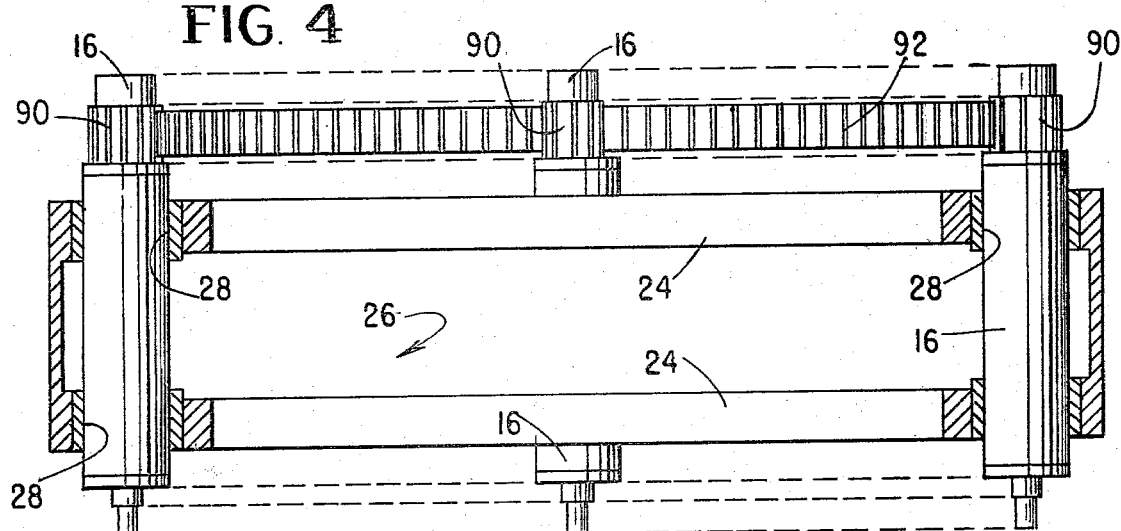
FIG. 4 is a cross section of the upper turret along lines 4—4 of the apparatus embodied by the invention.
Figure 3:
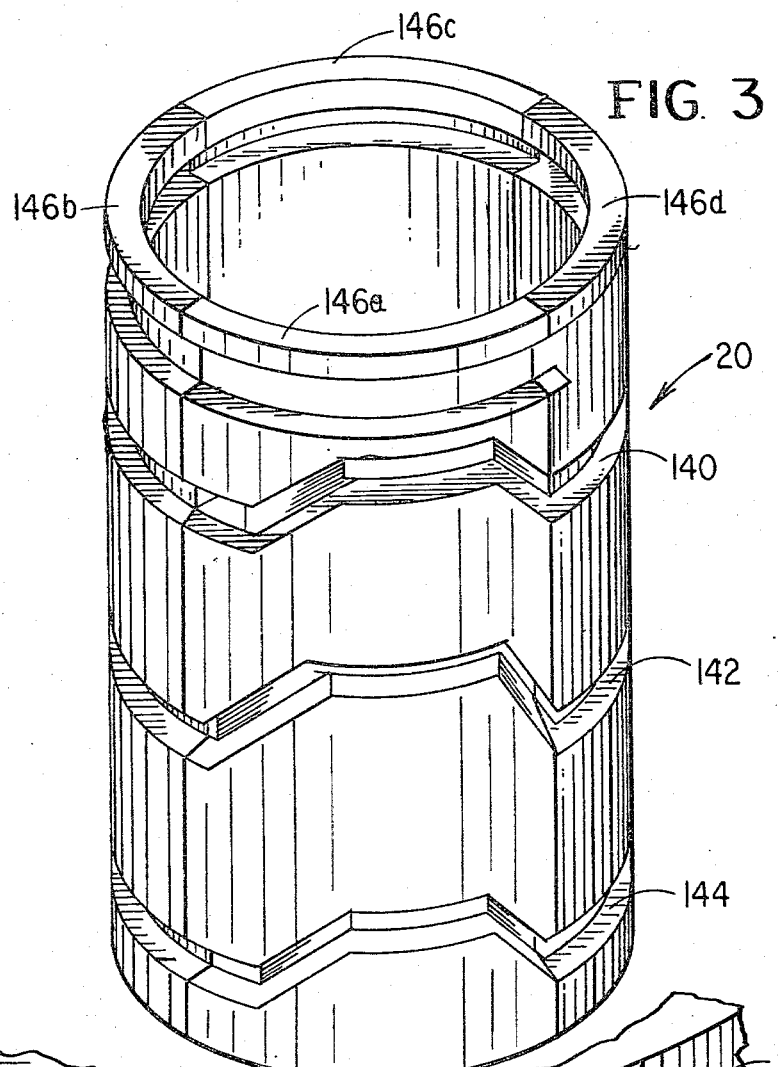
FIG. 3 is a perspective view of the barrel cam embodied by the invention.
Figure 10:
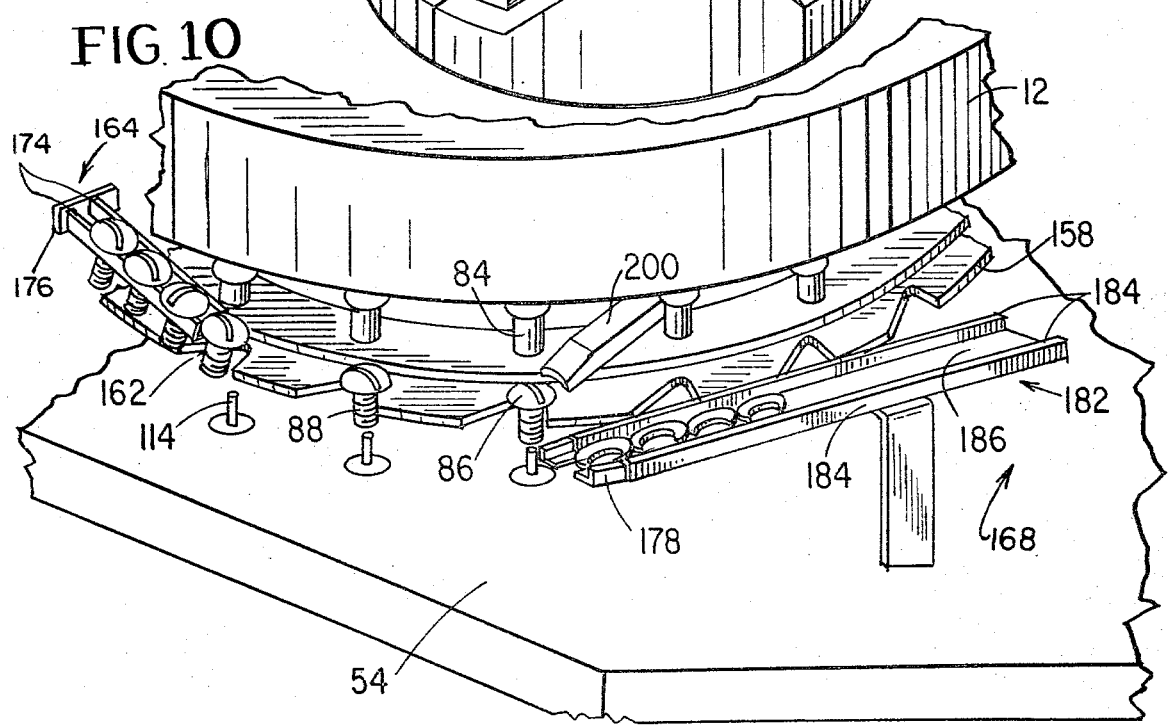
FIG. 10 is a partial front view of the screw support plate and washer input feed.
Figure 5:
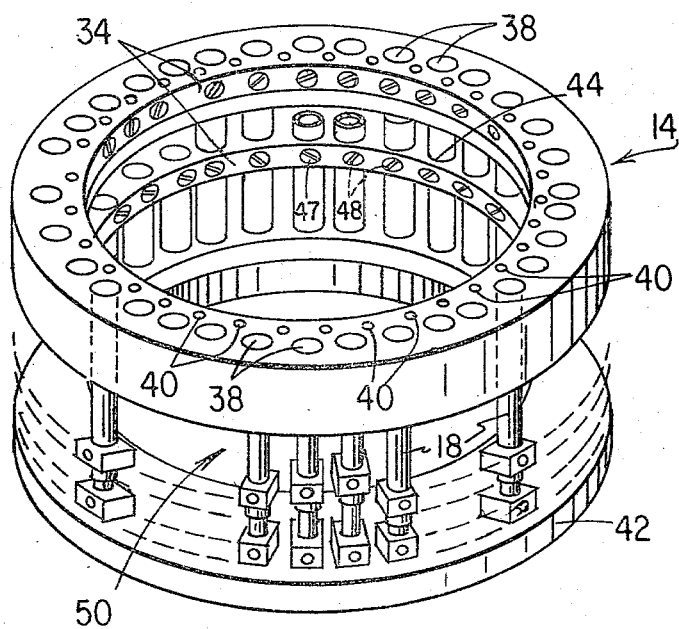
FIG. 5 is a perspective view of the lower turret of the apparatus embodied by the invention.
Figure 9:
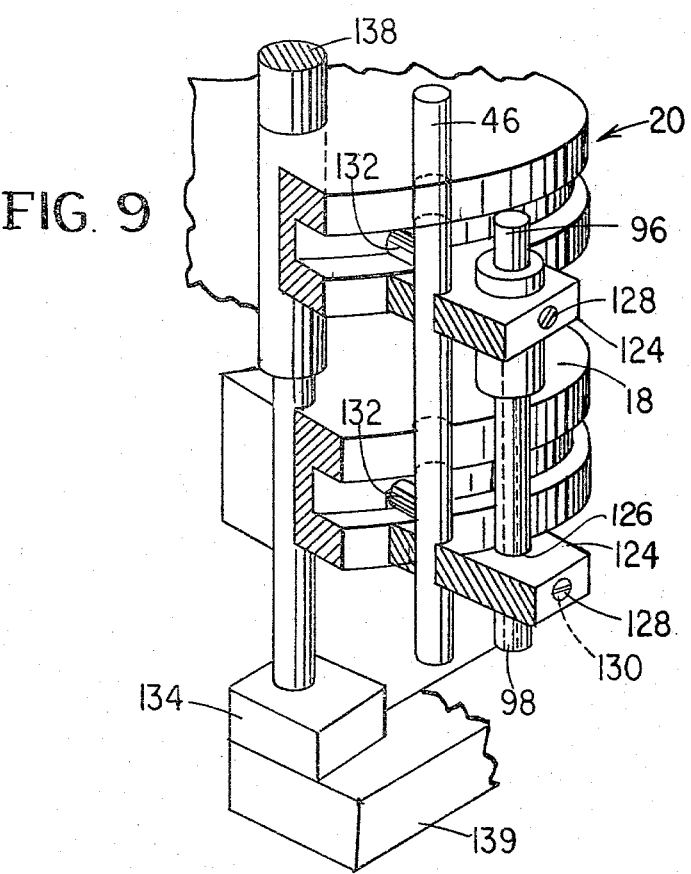
FIG. 9 is a partial cut-a-way view of the barrel cam and cam fork embodied by the invention.
Figure 8:
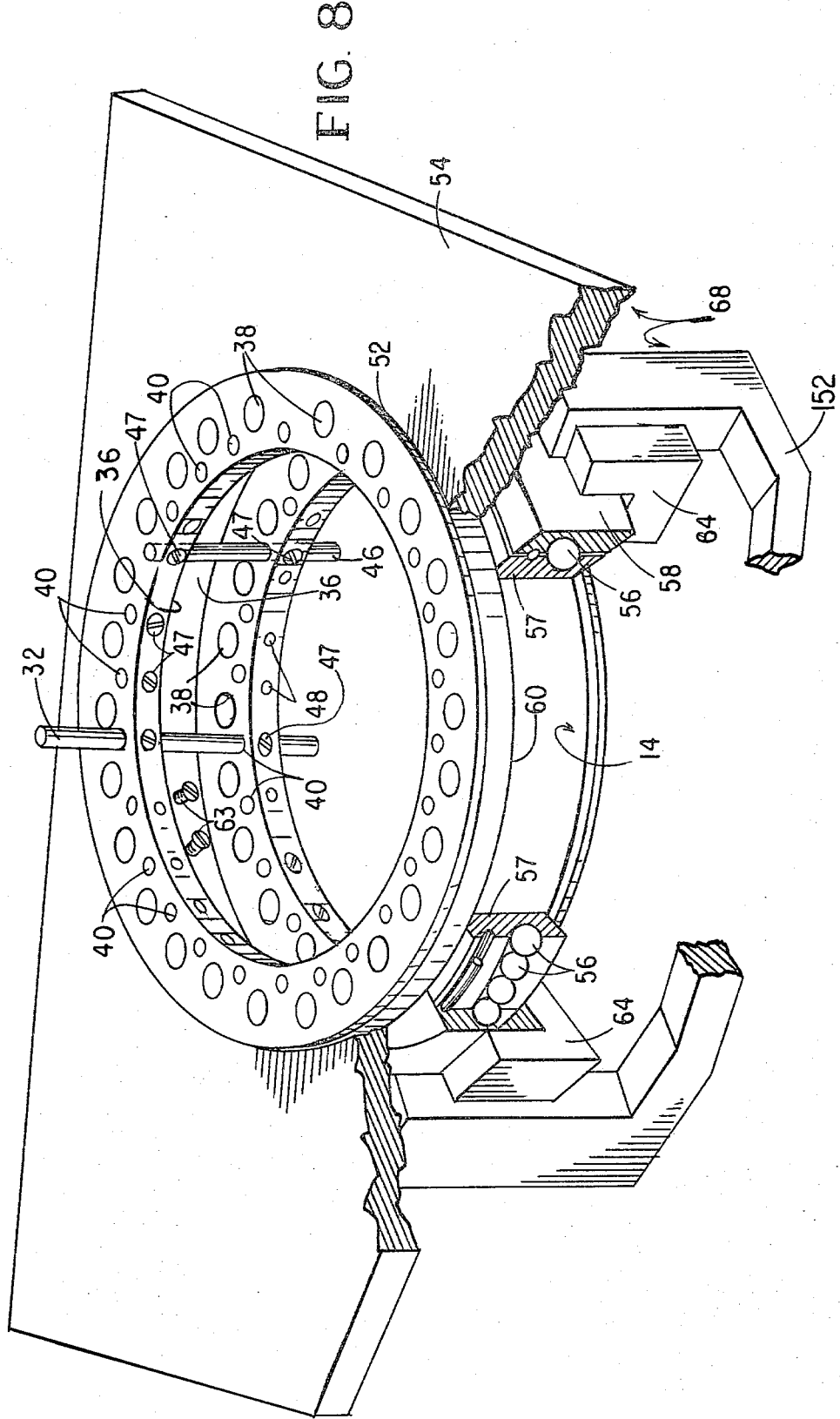
FIG. 8 is a cross section of lower turret along lines 8—8 of the apparatus embodied by the invention.
Figure 11:
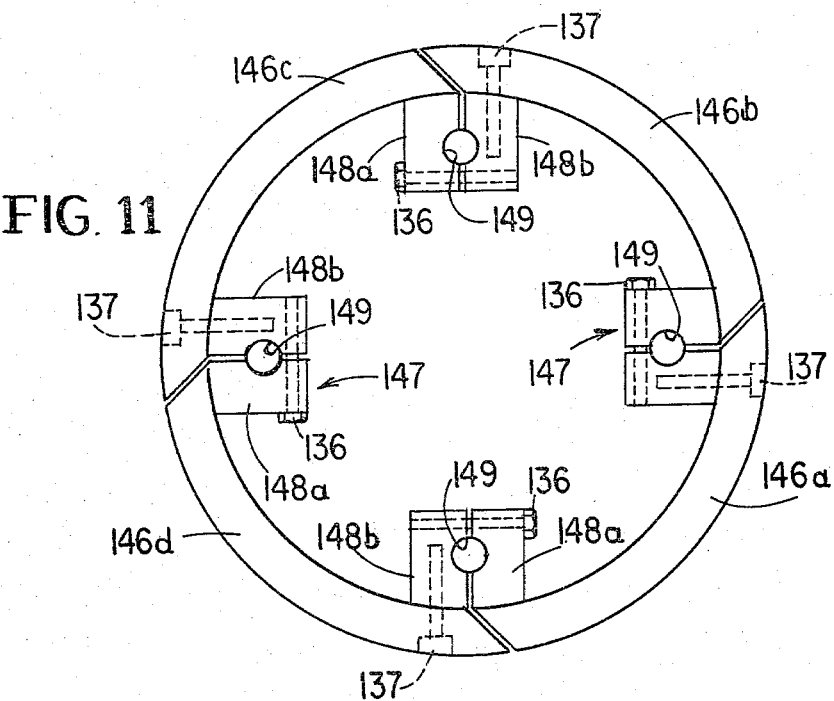
FIG. 11 is a plan view of the barrel cam and support rods of the apparatus embodied by the invention.
Figure 12:
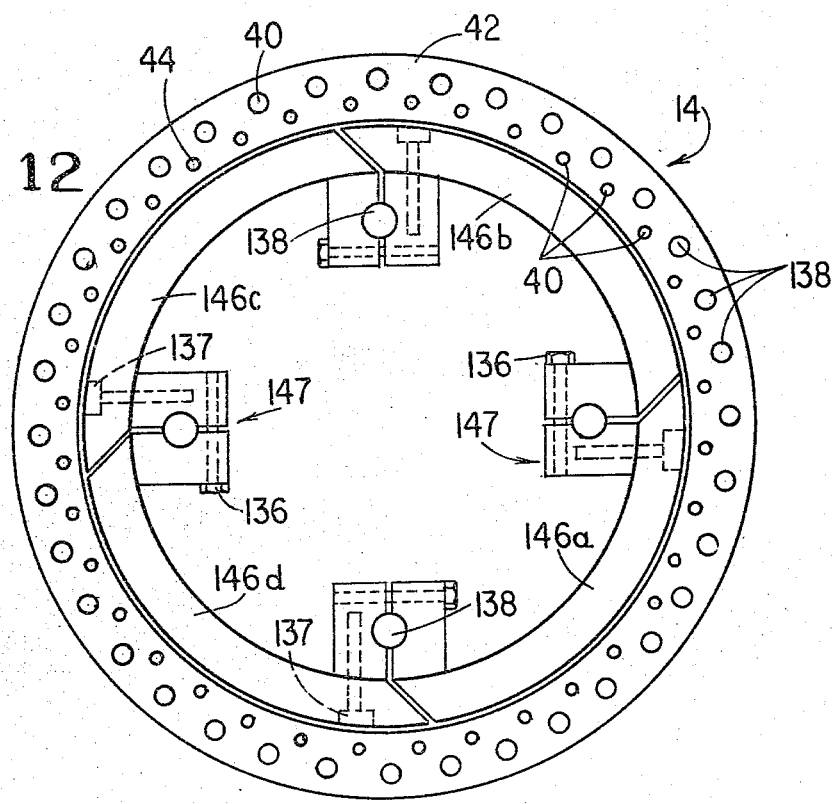
FIG. 12 is a plan view of the barrel cam, support rods and apertures for the guide rods and spindles of the apparatus embodied by the invention.
Figure 13:
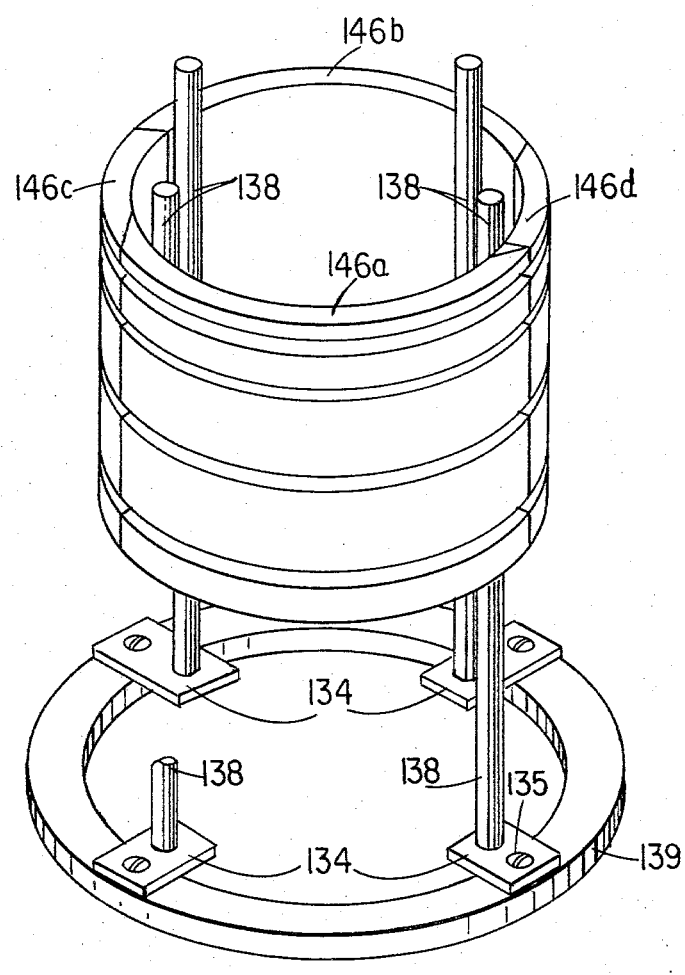
FIG. 13 is an exploded view of the support ring and rods of the apparatus embodied by the invention.

The continuous rotary and work process apparatus embodied by this invention, in its preferred form, is illustrated in the drawings, FIGS. 1 through 14, and is designated generally by the numeral 10. The continuous rotary and work process apparatus 10 is comprised of an upper annular turret 12 and a lower annular turret 14, a plurality of spindles 16 coupled to the upper annular turret 12 and a plurality of spindles 18 coupled to the lower annular turret 14, cam means 20 for imparting either reciprocatory or rotary motion to the plurality of the spindles 16 and 18 and drive means 22 coupled to the annular turrets 12, 14 for imparting rotary motion to said annular turrets.

The upper annular turret 12 is cast from steel, aluminum, or other suitable material into a channel shaped annulus having a pair of upper turret flanges 24 that define therebetween a channel 26. A plurality of upper spindle apertures 28 are circumferentially positioned through the upper turret flanges 24 for receiving therein and perpendicular thereto the upper spindles 16. The apparatus 28 may be formed in the upper annulus in the casting of the upper turret or they may be machined through the flanges 24 by means well known in the art. A plurality of support rod apertures 30 are circumferentially positioned adjacent the upper spindle apertures 28 of the upper turret 12 through the upper turret flanges 24 for having positioned therein support rods 32.

The lower annular turret 14 is cast from steel, aluminum, or other suitable material into a channel shaped annulus having a pair of lower turret flanges 34 which define therebetween a channel 36. A plurality of lower spindle apertures 38 are circumferentially positioned through the lower turret flanges 34. A plurality of lower support rod apertures 40 are also circumferentially positioned through the lower turret flanges 34 adjacent the said lower spindle apertures 38. The lower spindle apertures 38 are of a diameter suitable for receiving the lower spindles 18.

An annular support plate 42 having a diameter approximately equal to the lower turret 14 is positioned therebelow and coaxial therewith. The annular plate 42 has a plurality of support rod apertures 44. The plurality of lower support rod apertures 40 and the plurality of the annular plate support rod apertures 44 are positioned coaxial with each other enabling a lower support rod 46 to be positioned through and secured to said apertures 40, 44 by means well known in the art. One of the means for securing the lower support rods 46 within the apertures 40, 44 is by a set screw 47. The set screw 47 is positioned into a set screw aperture 48, said aperture being perpendicular to the apertures 40, 44 and extending to and forming a juncture with said apertures.

The combination of the lower annular turret 14 and the annular support plate 42 coupled thereto via the lower support rods 46 defines a spindle cage or retainer 50. A sprocket gear 51 is coupled to the spindle cage 50 below the annular plate 42 by means of a bolt 53 or by other means well known in the art. The sprocket gear 51 is coaxial with the lower turret and is substantially the same diameter as the annular plate 42. However, it is understood that the diameter of said sprocket may be smaller or larger than the diameter of the annular plate 42 without departing from the spirit and scope of the invention.

The spindle cage 50 is suspended within an aperture 52 of a top plate 54 by means of a plurality of radial anti-friction bearings 56 having an inner race 57 and an outer race 58; said bearings being well known in the art and readily available. The inner race 57 is coupled to the outer circumference of the lower annular turret 14 adjacent to and below a lip 60 of said lower annular turret. An inner race ring 61 securely positions the inner race 57 against the outer face or circumference of the lower annular turret 14 against the lip 60; the distance between the lip 60 and the keeper ring 61 being suitable for receiving and holding said inner race. A set screw 63 positioned through the channel section 36 of the lower turret 14 keeps the inner race 57 securely in position. The outer race 58 is coupled to the underside of the top plate 54 and coupled thereto by means of a bearing support ring 64. The bearing support ring 64 is attached to the underside of the top plate 54 by means of a threaded bolt 65 or by other means well known in the art. The outer race 58 is positioned so as to be supported by the bearing support ring 64. The positioning and coupling of the inner race 57 to the outer circumference of the lower annular turret 14 and the outer race 58 to the underside of the top plate 54 enables the cage 50 to rotate within the aperture 52 of the top plate 54; the top face of the lower annular turret 14 being flush with the top face of the plate 54. The top plate 54 is supported by a plurality of legs 66 coupled to the corners thereof by welding means or other means well known in the art. The top plate 54 and the legs 66 form a support structure 68.

The upper turret 12 is coupled to the lower turret 14 by means of the support rods 32. The support rods 32 are positioned into the support apertures 30 of the upper turret and support apertures 40, 44 of the cage 50; said support rod apertures being coaxial. The difference between the support rod 32 and 46 is length. The rod 32 is of a length sufficient to pass from the annular plate 42 of the cage 50 through the flanges 34 of the lower turret 14 and to and through the flanges 24 of the upper annular turret 12. The support rod 46 is of a length to pass only from the apertures 44 of annular plate 42 to and through the apertures 40 of the lower turret flanges 34. The rods 32 are coupled to the upper turret 12 through the support apertures 30, and the support rods 46 are coupled to the lower turret 14 and the annular plate 42 by set screws 47 positioned into set-screw apertures 48; said apertures being perpendicular to the aperture 30 and extending to and forming a juncture therewith. The number of support rods 32 may be equal, more, or less than the support rods 46, depending on the weight to be supported by said support rods.

The upper and lower spindles 16, 18 are working tools or devices and can be designed for either reciprocatory or rotary action depending on the function to be performed by such spindles. The design of the spindles can be readily changed to perform a different function as desired, thereby giving the apparatus a versatility unknown in the prior art. To facilitate the description of the preferred embodiment with respect to the spindles 16, 18, I will first discuss the upper spindles 16 followed by the lower spindles 18. It is understood that the upper and lower spindles are basically the same, their main difference and hence difference in construction, is due to the particular function they perform.

The upper spindles 16 have a tubular body 70, the outer diameter thereof being slightly smaller than the diameter of the upper spindle aperture 28. The tubular body 70 is of basic tubular stock that is treated, hardened, and chrome plated by means well known in the art. The length of body is sufficient to pass through the upper spindle apertures 28 of the flanges 26 of the upper annular turret 12; said tubular body having an open upper end 72 and an open lower end 74. An upper end cap 76 is coupled to the upper end 72 and a lower end cap 78 is coupled to the lower end 74 of the tubular body 70; said caps being coupled to said body by means well known in the art. The caps 76 and 78 each have an aperture 80 positioned in such a manner that when said caps are coupled to the body 70, they are coaxial. A shaft or quill 82 is positioned through the apertures 80 of the upper and lower caps 76, 78 and coupled to said end caps by bushings 83; said bushing being of a type well known in the art enabling the shaft to rotate therein. A socket head 84, suitable for receiving the head 86 of a screw 88 is attached to the lower end of the shaft 82. A pinion gear 90, well known in the art, is coupled to the upper end of the shaft 82; said pinion gear being suitable for mating with a bull or drive gear 92. Rotary motion is imparted to the shaft 82 via the bull or drive gear 92 and the pinion gear 90. Rotary motion is imparted to the drive gear 92 by means of a motor, not illustrated, to which it is directly coupled to by means well known in the art. The motor drives the gear 92 and hence the shaft 82 via the pinion gear 90 at a constant predetermined speed.

A bushing 94 is positioned between the upper spindle apertures 28 and the body 70 of the spindle 16 to enable the spindle 16 to move freely in a vertical direction. Vertical motion of the spindle 16 is programmed by the cam means 20 which I will discuss hereinafter.

The upper spindle shaft or quill 82 is comprised of two parts or segments; the upper part 82a to which the pinion gear 90 is coupled to and the lower part of segment 82b to which the socket head 84 is coupled to. The positioning of segment 82a and 82b is such that segment 82b is telescopically coupled to shaft segment 82a enabling 82b to be vertically raised and lowered as the upper spindle 16 is vertically raised and lowered by the cam means 20. The shaft segments 82a and 82b of shaft 82 are continuously rotating as the shaft segment is lowered and raised by the cam means 20.

The lower spindles 18, of my preferred embodiment are comprised of two separate spindles; a lower outer spindle 96 and a lower inner spindle 98. The outer lower spindle is comprised of a tubular body 100, the outer diameter thereof being slightly smaller than the diameter of the lower spindle apertures 38. The inner lower spindle 98 is also comprised of a tubular body 102 having an outer diameter slightly less than the inner diameter of the lower outer spindle 96; the lower inner spindle forming and being a telescopic member with the outer lower spindle 96. The tubular bodies 96 and 98, as the tubular body 70, are treated, hardened and chrome plated by means well known in the art. The tubular body 96 has an open upper end 104 and an open lower end 106. An upper end cap 108 having an aperture 110 is coupled to the open upper end of the outer spindle 96. The telescoping spindle 98 has an upper end 12 having a hook element 114 attached thereto. The hook element 114 is positioned at the upper end 112 of the telescoping or inner spindle 98 in a manner to enable the hook to pass through aperture 110 of the cap 108 of the outer spindle 96. A lower end cap 116 is coupled to the lower end 118 of the telescoping spindle 98.

The annular plate 42 has a plurality of apertures 120 positioned coaxial with the lower spindle apertures 38 suitable for receiving therein the lower end of the inner or telescoping spindle 98. A suitable bushing 122, well known in the art and readily available is positioned between the apertures 38 and the outer spindle 96 and between aperture 120 and the lower end of the inner or telescoping spindle 98.

The cam means 20 are coupled to each of the upper spindles 16, of the outer lower spindles 96 and the inner or telescoping spindles 98 by a cam fork 124. The cam forks 124 are coupled to their respective spindles by means well known in the art. The cam forks are basically of a rectangular configuration having a spindle aperture 126 suitable for receiving the spindle to which it is to be attached. Each spindle has a cam fork 124 attached thereto. One of the means for coupling the fork 124 to its respective spindle is by means of a set screw 128. The set screw 128 is positioned into a set screw aperture 130 that is perpendicular to the spindle aperture 126; said set screw aperture 130 extending to and juncturing with the aperture 126.

A cam follower 132 is coupled to the cam fork 124 by means well known in the art; said cam follower being coupled to the cam means 20.

The cam means 20 of my preferred embodiment is a segmented barrel cam. Barrel cams are well known in the art and are readily available. In my preferred embodiment I have used a three section, segmented barrel cam having three separate cam tracks 140, 142, and 144, each of said tracks being suitable for receiving and having positioned therein the cam followers 132. The barrel cam 20 is divided into four segments, 146a, 146b, 146c, and 146d, said segments being coupled together by means of a cam cage support means 147. The cam cage support means 147 comprises a split block 148 having sections 148a and 148b, said sections forming an aperture 149 when coupled together by means of bolt 136. A bolt 137 secures the block 148 to the barrel cam 20, there being a block 148 for each segment of the barrel cam. A plurality of cam cage support blocks 148 are positioned as necessary within the internal circumference of the barrel cam to insure a strong juncture between each pair of segments of the barrel cam. A cam cage support rod 138 is positioned within the aperture 149, said rod extending the vertical length of the barrel cam and engaging each aperture 149 coaxial therewith.

The cam support rods 138 are coupled to an annular cam support ring 139 by cam support rod plates 134, said plates being coupled to the ring 139 by means of bolts 135.

Each of the cam tracks 140, 142, and 144 program the vertical movement of the upper spindles 16, outer lower spindles 96 and the inner or telescoping spindles 98 respectively. Anyone or all of the cam tracks 140, 142, 144 can be easily changed when using the segmented barrel cam. The changing of a cam track will change the function of all the spindles coupled to that track via the cam follower 132 and cam fork 124. The segmented barrel cam 20 is positioned within the upper annular turret, and the lower spindle cage 50 so as to enable the cam followers 32 to be positioned within their proper cam track and coupled to the support structure 68. For example, all of the cam followers 132 coupled to the upper spindles via cam forks 124 are positioned in cam track 140; all of the cam followers 132 coupled to the lower outer spindles 96 via cam forks 124 are positioned in cam track 142; and all of the cam followers 132 coupled to the lower inner or telescopic spindles 98, via cam forks 124, are positioned in cam track 144. The barrel cam or cam means remains stationary while the upper turret and lower spindle cage 50 rotate thereabout.

A plurality of "L" shaped or angular support arms 152 couple the barrel cam 20 to the support structure 68; one end of said support arm being coupled to the top plate 54 and the other end thereof being coupled to the annular cam support ring 139 of the barrel cam, by means of threaded bolts 153. Means well known in the art other than threaded bolts 153 can be used to secure the barrel cams 20 to the support structure 66.

It is noted that it is possible to use two or more barrel cams in lieu of a single barrel cam as set forth herein without departing from the spirit and scope of the invention.

The drive means 22 comprises a motor 154 coupled to the support structure by means well known in the art and a sprocket drive chain 156 coupled to the motor and the sprocket gear 51. The motor 154 imparts motion to the sprocket gear 51 via the chain drive 156 thereby imparting motion to the lower spindle cage 50 and the upper annular turret 12 via support rods 32.

In my preferred embodiment, I use the apparatus to position a pair of washers onto a screw. Therefore I use an annular screw support plate 158 that is positioned between the lower spindle cage 50 and the upper annular turret 12, above the top plate 54 of the support structure 68.

The annular screw support plate 158 has a plurality of apertures 160 through which support rods 32 pass therethrough and are coupled thereto by means well known in the art. A plurality of notches 162 are positioned along the circumferential edge of the screw support plate for holding the screw 88 in a position that the screw head is coaxial with the upper turret spindles 16. There is a notch for each upper spindle 16 thereby enabling a screw 88 to be positioned below each of the plurality of upper spindles 16.

Screw supply means 164 well known in the art are provided for supplying a steady stream of screws 88 to the screw support plate 158. A metal washer supply means 166 and a rubber washer supply means 168 well known in the art are used to supply a metal washer 170 and a rubber washer 172 to the upper end of the outer spindle 96 for engagement by the hook element 114.

The screw supply means 164 for supplying the screw 88 to the screw support plate 158 is a gravity feed track positioned adjacent the screw support plate 158 in a manner enabling each notch 162 of the support plate 158 to receive a screw 88 as it passes by the gravity feed track 164. The screw supply means 164 is comprised of a pair of plates 174 positioned parallel to each other and separated by a distance sufficient to enable the body of screw 88 to pass therebetween but not the head 86. The screw supply means 164 is inclined to enable the screws to flow to the screw support plate 158 by means of gravity. The parallel plates 174 are coupled together by means of tie bars 176.

The washer supply means are basically the same comprising a channel 182 having a pair of parallel sides 184 and a bottom plate 186. The channel 182 is of a width sufficient to enable the washers 170 or 172 to pass therethrough, said channel being inclined to enable said washers to pass therethrough by means of gravity. The rubber washer supply means is positioned so that its lower end is adjacent the upper end of outer spindle in a manner that the opening of the washer 172 is positioned over the aperture 110 of the upper end cap 108 thereby enabling the hook 114 to fix said washer in place. When the rubber washer 172 is positioned onto the hook 114 it is ready to receive the metal washer 170 from the metal washer supply means 166. The metal washer supply means is inclined and positioned adjacent an upper end cap 108 of spindle 96 to enable a washer to be deposited onto hook 114 on top of the rubber washer 172. The washer supply means 166 and 168 each have a pair of jaws 178 that enable one washer at a time to be positioned on the hook element 114. The jaws 178 restrict the flow of washers at the end thereof adjacent the spindle cage 50. The jaws 178 may be spring loaded or otherwise controlled by means well known in the art to restrict the flow of washers but will allow one washer to pass therethrough upon application of a slight force; said force being supplied by the hook element 114 engaging said washer and moving it from the jaws by the rotary motion of the spindle cage 50 as it rotates about the cam means 20.

The metal washer 170 positioned on top of the rubber washer 172 is raised by means of outer spindle 96 to meet the screw 88 whereupon said screw engages said washers. When the washers 170, 172 are secured to the screw 88, the combination is removed from the notch 162 by screw removal means 200. The screw removal means is comprised of a skieve or metal piece positioned to hit the screw and remove it from the notch 162 of the screw support plate 158 as the upper and lower annular turrets rotate. As each notch passes the skieve, the screw 88 with its attached washers is removed. The screw removal means or skieve 200 is coupled to the apparatus 10 by bolts, screws or other means well known in the art.

The screw feed track 164, the metal washer supply means 166 and 168, and the screw removal means 200 are selectively positioned around the circumference of the annular turret to enable the screw to be coupled to the washers and then removed during one revolution of the upper turret and lower spindle cage. Therefore, for each upper spindle and its coaxial lower spindles acting together there is a unit comprising a screw 88 being coupled to a metal washer 170 and rubber washer 172 for each revolution of the spindle.

In operation, a screw 88 is positioned onto the screw support plate in a manner that the screw head 86 is coaxial with the screw socket head 84 coupled to the shaft 82 of the upper spindle 16. Simultaneously, washers 170 and 172 are being selectively deposited, at different circumferential locations, upon the upper end cap 108 of the outer spindle 96 each time a spindle 96 is in position to receive said washer.

The shaft 82 is rotating constantly at a predetermined speed as the cam track 140 causes the spindle 16 to lower until the socket head 84 engages the screw head 88 and imparts a rotary motion thereto. The rubber washer 172 is deposited first onto the upper end cap 108 of the outer spindle 96 at which time the hook element 114 emerges out of the aperture 110 engaging said washer. The movement of the hook element out of the aperture 110 is programmed by cam track 3 to which the cam followers 132 are coupled to cam forks 124, said forks being coupled to the inner or telescopic spindle 98. The hook element 114 is programed to drop slightly as it passes adjacent to the metal washer input 166; the hook element 114 being programed to rise thereafter engaging both the washers 170, 172. When both the washers 170, 172 are engaged by the hook element 114, the outer spindle 96 is programed by cam track 142 to begin a gradual rise, hook 114 being lowered below aperture 110, and the washers 170, 172 meeting the screw 88 and being engaged thereon by the rotary motion of the screw. When the washers 170, 172 are attached to the screw 88, the outer spindle is programed, via cam track 142, to lower itself to its original position leaving the screw 88 with its attached washers 170, 172 in the screw support plate 158, at which time they are removed by the screw removal means 200.

A spring cushion 202 is coupled to the shaft or quill 82 by means of a snap ring 204, said spring cushion being positioned between the snap ring 204 and the end cap 76. The spring cushion enables a smooth vertical transition of the quill 82.

It is believed that the invention has been described in such detail as to enable those skilled in the art to understand the same and it will be appreciated that variations may be made without departing from the spirit and scope of the invention.

What is desired to secure by Letters Patent in the United States is:

1. A continuous rotary and work process apparatus comprising:
    an upper annular turret;
    a lower annular turret coaxial with and coupled to said upper annular turret;
    a plurality of spindles circumferentially positioned about the upper annular turret;
    a plurality of spindles circumferentially positioned about the lower annular turret and coaxial with the plurality of the upper annular turret spindles;
    cam means removably mounted within the annulus of said turrets coupled to said spindles and positioned to enable access thereto from either the upper or lower turret; said means defining a movement for said spindles;
    a plurality of upper support rods coupled to the upper and lower annular turrets enabling the spindle positions in said upper and lower annular turrets to be in an accurate relationship to each other defining a definite registration between the upper and lower spindles;
    a support structure to which the lower annular turret is coupled thereto; and
    drive means coupled to the periphery of the support structure for imparting rotary motion to the upper and lower annular turrets.

2. A continuous rotary and work process apparatus as defined in claim 1 wherein said upper annular turret comprises a pair of upper turret flanges defining a channel therebetween.

3. A continuous rotary and work process apparatus as defined in claim 2 wherein said upper annular turret further comprises a plurality of upper spindle apertures through the pair of upper turret flanges for receiving therein the upper spindles.

4. A continuous rotary and work process apparatus as defined in claim 3 wherein said upper annular turret further comprises a plurality of circumferentially positioned upper support rod apertures through said pair of upper flanges.

5. A continuous rotary and work process apparatus as defined in claim 4 wherein the lower annular turret comprises a pair of lower turret flanges defining a channel therebetween.

6. A continuous rotary and work process apparatus as defined in claim 1 wherein said lower annular turret further comprises a plurality of lower spindle apertures through said pair of lower flanges for receiving therein the lower spindles.

7. A continuous rotary and work process apparatus as defined in claim 6 wherein said lower annular turret further comprises a plurality of circumferentially positioned lower support rod apertures.

8. A continuous rotary and work process apparatus as defined in claim 7 wherein said apparatus further comprises an annular support plate coupled to the lower annular turret; the lower annular turret and annular support plate forming a spindle cage.

9. A continuous rotary and work process apparatus as defined in claim 8 wherein said annular plate has a plurality of circumferentially positioned apertures coaxial with the lower spindle apertures of the lower turret.

10. A continuous rotary and work process apparatus as defined in claim 9 wherein said annular plate has a plurality of lower rod apertures coaxial with the lower support rod apertures of the lower annular turret.

11. A continuous rotary and work process apparatus as defined in claim 10 wherein said apparatus further comprises a plurality of lower support rods in addition to the upper support rods; the lower support rods being positioned through lower support rod apertures of the lower annular turret and annular plate; the upper support rods being positioned through the annular plate support rod apertures and the upper and lower annular plate support rod apertures.

12. A continuous rotary and work process apparatus as defined in claim 11 wherein said apparatus further comprises:
    means for coupling the lower support rods to the annular plate and the lower annular turret and for coupling the upper support rods to the annular plate and lower and upper annular turrets.

13. A continuous rotary and work process apparatus as defined in claim 12 wherein said support structure comprises:
    a top plate having an aperture disposed therein, said aperture being slightly larger than the diameter of the lower turret; and
    a plurality of legs coupled to said top plate.

14. A continuous rotary and work process apparatus as defined in claim 13 wherein the top plate of the support structure further comprises:
    a channel positioned circumferentially on the face of the top plate aperture.

15. A continuous rotary and work process apparatus as defined in claim 14 wherein said apparatus further comprises:
    a plurality of bearings coupled to the lower annular turret and the channel positioned circumferentially on the face of top plate aperture enabling the lower annular turret to rotate freely within said aperture.

16. A continuous rotary and work process apparatus as defined in claim 15 wherein each of said plurality of upper spindles comprises:
    a tubular body having an open upper and lower end;
    an upper end cap having an aperture centrally positioned therethrough and coupled to the open upper end of the tubular body; and
    a lower end cap having an aperture centrally positioned therethrough and coupled to the open lower end of the tubular body, said aperture being coaxial with the upper end cap aperture.

17. A continuous rotary and work process apparatus as defined in claim 16 wherein each of said plurality of upper spindles further comprises:
an upper spindle shaft extending the length of the tubular body and through the upper end cap aperture and lower end cap aperture.

18. A continuous rotary and work process apparatus as defined in claim 17 wherein each of the plurality of upper spindles further comprises:
a pinion gear coupled to the upper end of the upper spindle shaft adjacent the upper end cap; and
a socket head coupled to the lower end of the upper spindle shaft, said socket head being suitable for receiving the head of a screw.

19. A continuous rotary and work process apparatus as defined in claim 18 wherein each of the plurality of upper spindles further comprise a cam fork coupled to the tubular body.

20. A continuous rotary and work process apparatus as defined in claim 19 wherein each of the plurality of lower annular turret spindles comprises:
an outer spindle; and
an inner telescoping spindle coupled to said outer spindle.

21. A continuous rotary and work process apparatus as defined in claim 20 wherein the outer spindles of each of the plurality of lower annular turret spindles comprises:
a tubular body having an open upper and lower end; and
an upper end having an aperture coupled to the upper open end of the tubular body, the aperture and said tubular body being coaxial.

22. A continuous rotary and work process apparatus as defined in claim 21 wherein the outer spindles of each of the plurality of lower annular turret spindles further comprises:
a cam fork coupled to the tubular body.

23. A continuous rotary and work process apparatus as defined in claim 22 wherein the inner telescoping spindles of each of the plurality of lower annular turret spindles comprises:
a tubular body having an open upper and lower end;
a hook element coupled to the upper end of the tubular body; and
an end cap coupled to the lower end of said tubular body; said hook being positioned to enable it to move through the upper end cap aperture of the outer spindle.

24. A continuous rotary and work process apparatus as defined in claim 23 wherein each of the inner telescoping spindles of the plurality of lower spindles further comprises a cam fork coupled to its tubular body.

25. A continuous rotary and work process apparatus as defined in claim 24 wherein each of the outer spindles of the plurality of lower spindles further comprises a cam fork coupled to its tubular body.

26. A continuous rotary and work process apparatus as defined in claim 25 wherein the cam forks coupled to the tubular bodies of each of the plurality of upper spindles and each of the lower outer and telescoping spindles further comprise a cam follower coupled thereto and suitable for engaging the cam means.

27. A continuous rotary and work process apparatus as defined in claim 26 wherein the cam means comprises:
a segmented barrel cam coupled to the support structure.

28. A continuous rotary and work process apparatus as defined in claim 27 wherein the segmented barrel cam further comprises three cam tracks; one of said cam tracks being for each of the plurality of upper spindles; the second of said cam tracks being for each of the plurality of the outer spindles of the lower turret spindles; and the third cam track being for each of the plurality of inner telescoping spindles of the plurality of lower turret spindles, the cam tracks being suitable for engagement by the cam followers, said tracks defining the movement of the spindles coupled thereto.

29. A continuous rotary and work process apparatus as defined in claim 28 wherein said apparatus further comprises:
a drive gear coupled to each pinion gear of the plurality of upper turret spindles;
a motor; and
means coupled between said motor and drive gear, wherein said drive gear imparts a rotary motion to the pinion gears, said pinion gears imparting a rotary motion to the upper spindle shaft.

30. A continuous rotary and work process apparatus as defined in claim 29, wherein said apparatus further comprises a screw support plate positioned between the upper and lower annular turrets and being coaxial therewith.

31. A continuous rotary and work process apparatus as defined in claim 30 wherein said screw support plate is coupled to the upper support rods coupling the upper annular turret to the lower annular turret.

32. A continuous rotary and work process apparatus as defined in claim 31 wherein said screw support plate has a plurality of circumferentially positioned notches for receiving a screw.

33. A continuous rotary and work process apparatus as defined in claim 32 wherein said apparatus further comprises a sprocket gear coupled to the annular plate.

34. A continuous rotary and work process apparatus as defined in claim 33 wherein said drive means comprises:
a motor coupled to the support structure; and
a sprocket chain coupled to the motor and sprocket gear, wherein the motor imparts motion to the sprocket chain that enables the sprocket gear to rotate and the lower and upper annular turrets coupled thereto.

35. A continuous rotary and work process apparatus as defined in claim 34 wherein the means for coupling the lower support rods to the annular plate and the lower annular turret and for coupling the upper support rods to the annular plate and the lower and upper annular turrets comprises:
a set screw positioned in a threaded aperture, said threaded aperture being perpendicular to the support rod apertures and forming a juncture therewith.

* * * * *

UNITED STATES PATENT OFFICE
CERTIFICATE OF CORRECTION

Patent No. 4,224,729  Dated September 30, 1980

Inventor(s) GEORGE M. TARZIAN

It is certified that error appears in the above-identified patent and that said Letters Patent are hereby corrected as shown below:

Abstract, last line - "fo" should be --of--

Column 1, line 8 - "apparatuseses" should be --apparatuses--

Column 3, line 26 - "apparatus" should be --apertures--

Column 5, line 64 - "12" should be --112--

Column 8, line 39 - "168" should be --170--

Signed and Sealed this

Thirteenth Day of January 1981

[SEAL]

Attest:

SIDNEY A. DIAMOND

Attesting Officer   Commissioner of Patents and Trademarks